United States Patent
Abrahamse et al.

(10) Patent No.: US 9,307,780 B2
(45) Date of Patent: *Apr. 12, 2016

(54) PROCESS FOR PRODUCING SLOWLY DIGESTIBLE STARCH

(71) Applicant: N.V. Nutricia, Zoetermeer (NL)

(72) Inventors: Evan Abrahamse, Amersfoort (NL); Wynette Hermina Agnes Kiers, Zetten (NL); Houkje Bouritius, Zeist (NL); Koenraad Gerard Christoffel Weel, Bennekom (NL)

(73) Assignee: N.V. NUTRICIA, Zoetermeer (NL)

( * ) Notice: Subject to any disclaimer, the term of this patent is extended or adjusted under 35 U.S.C. 154(b) by 131 days.

This patent is subject to a terminal disclaimer.

(21) Appl. No.: 14/149,086

(22) Filed: Jan. 7, 2014

(65) Prior Publication Data

US 2014/0220174 A1    Aug. 7, 2014

Related U.S. Application Data

(63) Continuation of application No. 12/521,617, filed as application No. PCT/NL2007/050706 on Dec. 28, 2007, now Pat. No. 8,642,110.

(30) Foreign Application Priority Data

Dec. 29, 2006  (EP) ..................................... 06127375

(51) Int. Cl.
*A23L 1/05*    (2006.01)
*C08B 30/00*   (2006.01)
(Continued)

(52) U.S. Cl.
CPC ............... *A23L 1/095* (2013.01); *A23D 7/0053* (2013.01); *A23L 1/0522* (2013.01); *A23L 1/30* (2013.01); *A23L 1/307* (2013.01); *C08B 30/12* (2013.01); *A23V 2002/00* (2013.01)

(58) Field of Classification Search
CPC ...... A23D 7/0053; A23L 1/0522; A23L 1/30; A23L 1/307; A23L 1/095; C08B 30/12; A23V 2002/00; A23V 2200/328; A23V 2250/5118; A23V 2200/332; A23V 2200/254
USPC ....................................... 426/2, 520, 656, 661
See application file for complete search history.

(56) References Cited

U.S. PATENT DOCUMENTS

| 8,642,110 B2 * | 2/2014 | Abrahamse et al. .......... 426/661 |
| 2006/0257977 A1 | 11/2006 | Hamaker et al. |
| 2007/0134392 A1 * | 6/2007 | Muller et al. ................. 426/549 |

FOREIGN PATENT DOCUMENTS

| CA | 2 548 775 A1 | 6/2005 |
| EP | 05103102.6 | 7/2005 |

(Continued)

OTHER PUBLICATIONS

Severjnen et al. "Sterilisation in a liquid of a specific starch makes it slowly digestible in vitro and low glycemic in rats", Journal of Nutrition, 137:2202-2207, 2007.

(Continued)

*Primary Examiner* — Nikki H Dees
*Assistant Examiner* — Subbalakshmi Prakash
(74) *Attorney, Agent, or Firm* — Browdy and Neimark, PLLC

(57) ABSTRACT

A sterilized food product containing starch, the starch having: (a) an amylose content of at least 60 wt. %; (b) a median particle size of between 1 and 15 μm, at least 90 wt. % of the starch particles having a particle diameter of less than 50 μm; and (c) a non-digestible starch content of less than 50 wt. %. The product is obtained by heating and rapidly cooling the starch product and has a high slowly digestible starch content. It is suitable for use in the treatment of diabetes, obesity, insulin resistance, or for postprandial glucose response.

15 Claims, 1 Drawing Sheet

(51) Int. Cl.
  A23L 1/09    (2006.01)
  A23D 7/005   (2006.01)
  A23L 1/0522  (2006.01)
  A23L 1/30    (2006.01)
  A23L 1/307   (2006.01)
  C08B 30/12   (2006.01)

(56) References Cited

FOREIGN PATENT DOCUMENTS

| EP | 05112530.0    |    | 12/2005 |
|----|---------------|----|---------|
| EP | 1 723 853     | A2 | 11/2006 |
| WO | 9603057       | A1 | 2/1996  |
| WO | 9725875       | A1 | 7/1997  |
| WO | 9747657       | A1 | 12/1997 |
| WO | 2004/069877   | A1 | 8/2004  |
| WO | 2007004883    | A2 | 1/2007  |

OTHER PUBLICATIONS

ActiStar Product Description of starch; http://www.cargillfoods.com/na/en/products/starches-derivatives/resistant-starches/actistar-rmresistant-starches/index.jsp, retrieved Oct. 25, 2013.

Guraya et al. "Effect of Cooling, and Freezing on the Digestibility of Debranched Rice Starch and Physical Properties of the Resulting Material", Starch, 53:64-74, 2001.

Kishida et al. "Heat moisture treatment of high amylose cornstarch increases its resistant starch content but not its physiologic effects on rats," Journal of Nutrition, 131:2716-2721, 2001.

Leszczynski, "Resistant starch—classification, structure, production," Polish J. Food & Nutr. Sciences, 3/54, SI 1:37-401, 2004.

Englyst et al. "Classification and measurement of nutritionally important starch fractions" Europ J Clin Nutrition, 46 (Suppl. 2): S33-50, 1992.

Sajilata et al. "Resistant Starch—A review", Compr Rev Food Science & Food Safety, 5: -17, 2006.

Guraya et al. "Effect of enzyme concentration and storage temperature on the formation of slowly digestible starch from cooked debranched rice starch" Starch 53:131-139, 2001.

Gordon et al. "Resistant starch: physical and physiological properties," in: New Technologies for Healthy Foods & Neutraceuticals, pp. 157-178, 1997.

Liu, Q. "Understanding Starches and their role in foods," in: Food Carbohydrates Chemistry, Physical Properties, and Applications, pp. 309-356, 2005.

Horiba Scientific, "Guidebook to Particle Size Analysis", 2012.

* cited by examiner

PROCESS FOR PRODUCING SLOWLY DIGESTIBLE STARCH

FIELD OF THE INVENTION

The invention relates to a process for producing slowly digestible starch by treatment of high-amylose starch. The invention further pertains to a slowly-digestible starch product and to its dietetic use.

BACKGROUND OF THE INVENTION

Glucose is an important source of energy to the cells in the human body and is abundantly present in food ingredients. After consumption of starch or other dietetic available sources of glucose and their subsequent digestion, glucose is released in the gastro-intestinal tract, where it is rapidly and effectively absorbed from the intestinal lumen. This will usually increase glucose concentrations in blood. The change in glucose after consumption of a food is called the postprandial glucose response (PPGR), which can be measured as the area under the curve (AUC), which plots the plasma glucose concentration with time. The human body strives to maintain homeostasis of glucose levels in tissue and blood with time, in order to allow proper functioning of all cells. One important instrument to achieve glucose homeostasis is the release of insulin by the pancreas when the concentration of specific food components like glucose starts to increase. Under normal circumstances this will increase glucose transport into the cell and formation of glycogen using glucose, and trigger other metabolic changes, therewith rapidly causing the blood glucose levels to decrease to normal levels.

A person that does not react properly on released insulin is said to be insulin-resistant. Large groups of persons suffer from insulin resistance like many obese persons, persons suffering from the so-called metabolic syndrome (or syndrome X), diabetics and many patients in hospitals or nursing homes who developed a temporary or longer lasting insulin resistance as a cause of their disease. Part of the diabetics also experience an insufficient capacity to increase insulin concentrations in blood after consumption of food (i.e., post-prandially). Persons that suffer from insulin-resistance demonstrate abnormal high postprandial glucose response, even after consumption of moderate amounts of food ingredients that comprise glucose. When high postprandial glucose concentrations occur relatively frequently and over longer periods of time, they can cause several severe health problems. Known secondary side effects, as can be found in diabetics, are problems in the cardio-vascular system, such as hypertension, atherosclerosis, poor blood supply to peripheral tissues, stroke, heart attacks etc., as well as problems in the kidney, in particular an abnormal glomerular filtration rate, and a wide range of neuropathies and retinopathies like cataract. It was also found that mortality of severe disease in hospital patients is associated with the severity of insulin resistance.

The decrease of postprandial glucose response (PPGR) has been the subject of numerous research efforts. Many types of carbohydrates have been proposed to induce a low PPGR. Also inclusion of dietetic fiber in parental a nutritional product has been proposed for this purpose, for example viscous fibers, like gums or pectin. The disadvantage of using such fibers is the increase in viscosity, leading to bloating, flatulence, loss of appetite and possibly constipation, when used in liquid products in amounts that are effective.

U.S. Pat. No. 6,890,571 teaches the use of slowly digestible starch as a carbohydrate which provides glucose over an extended period of time, e.g., for the treatment of hyperglycemia, insulin resistance, hyperinsulinemia, dyslipidemia, dysfibrinolysis and obesity. The starch according to U.S. Pat. No. 6,890,571 is enzymatically debranched for at least 90% and comprises linear alpha-glucans, preferably a highly crystalline amylose having 5-65 anhydro-glucose units linked by alpha-1,4-D-glucoside bonds and a DE>6.0. No change in the material properties is observed during typical food processing conditions, when included in an amount of 1-50 wt. % in a wide range of food products. During the test, between 22 and 50 wt. % is digested in the first twenty minutes, and 48-74 wt. % is digested within two hours, after start of the test. Table 2 of U.S. Pat. No. 6,890,571 demonstrates the digestibility profile obtained after heating at 85° C. for 20 minutes and cooling and crystallising at room temperature: about 31-40 wt. % is digested during the first 20 minutes (rapidly digestible) and 29-36 wt. % between 20 and 120 minutes (slowly digestible) after start of the test. The document is silent about the behavior of the ingredient, when it is subjected to heating at higher temperatures and in particular ultra high heat treatments, as can be beneficially used during manufacture of enteral clinical nutrition. It is also silent about the effect of heating in a matrix that comprises proteins and/or lipids and/or other carbohydrate fractions. These components are known to be able to interact with amylose crystallisation and therewith digestibility.

EP-A 0688872 describes a method for producing resistant starch by enzymatic debranching of maltodextrins and retrogradation. The product is commercially available as Actistar® (resistant maltodextrin).

EP-A 0846704 (U.S. Pat. No. 6,043,229) discloses a retrograded starch having more than 55 wt. % resistant starch, derived from potato or preferably tapioca maltodextrin by dissolution, acidification, debranching by isoamylase treatment followed by spray drying. This resistant starch has more than 50% of linear chains of alpha-glucans having a DP between 10-35 and a DSC melting peak temperature below 115° C. It is suitable for use as a prebiotic component, in particular as a butyrate-producing fiber.

WO2005/000904 discloses resistant starch compositions obtained by heating malto-dextrin-derived resistant starch in oil at about 150° C. followed by rapid cooling to about 70° C. and aseptic packaging. For producing a complete food, other components, especially water-based such as proteins and carbohydrates, are separately sterilized and then added to the heat-treated starch-in oil, because otherwise about half of the resistant starch content is lost.

US2006/0025381 describes a chemically modified starch for controlling providing glucose release over extended periods of time. The resulting modified starch provides less than 25 wt. % glucose at 20 minutes and between 30 and 70 wt. % at 120 minutes. The modification can be achieved by hydroxyalkylation, acetylation, octenyl-succinylation, phosphorylation and the like.

WO2004/069877 discloses a process of producing a gettable starch product by heating starch having a low amylose content (below 50 wt. %, in particular 20-30 wt. %) to at least 170° C., in particular around 200° C. under mildly acidic conditions, followed by rapid cooling. This document is silent about stability of the slowly digestible starch content.

It was found by the inventors that a commercial resistant starch having a useful content of slowly digestible starch, when stored for some weeks, looses its slowly digestible starch content and turns into a sandy, unattractive product. The disadvantage is especially serious in liquid products, in which the starch forms an undesired sediment after some time.

Hence, it is an object of the invention to provide a process for providing a slowly digestible starch without chemical modification, which is stable under conventional storage conditions.

Another object of the invention is to provide a process for producing a nutritional product, that is effective in rapidly providing glucose to the consumer and maintaining a clinically significant supply of glucose during a prolonged time without resulting in undesirably high concentrations of glucose in the blood, even in persons that have become insulin-resistant.

It is a further object of the invention to a provide nutritional product for persons that suffer from insulin resistance, in order to prevent development of disorders which result from prolonged and frequent high levels of glucose in blood, such as those diseases that result from advanced glycation end-products (AGE), neuropathies, retina problems, and kidney problems.

DESCRIPTION OF THE INVENTION

Figure 1:
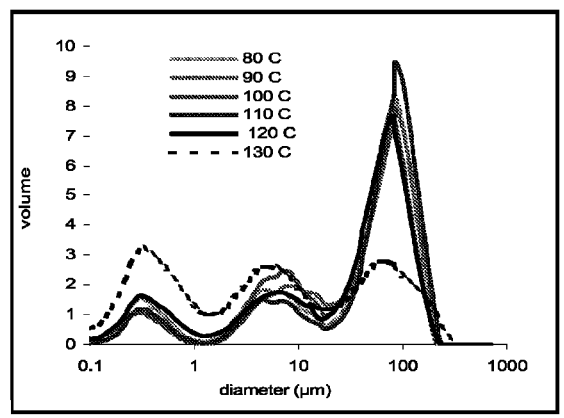
FIG. 1 shows particle size distribution of Actistar® that has been heated for 5 minutes at various elevated temperatures and then cooled to room temperature with running tap water. Details are provided in Example 1.

It was found according to the invention that the problem of instability and unattractive mouth-feel of slowly digestible starches could surprisingly be overcome by heating a resistant starch product, in the presence or absence of other food components, up to at least 120° C. for at least 3 minutes, followed by rapid cooling to a temperature below 20° C. The resulting product remains unaltered and dispersed when in liquid form for extended periods of time for at least 1 month, when stored at temperatures below 10° C.

The product obtained by the process of the invention is a high amylose starch having a substantial content of slowly digestible starch (slow-release glucose), and a narrow distribution of relatively fine particles. It also has relatively low proportions of readily digestible starch and non-digestible starch, thus simultaneously minimizing fecal problems, caused by large volumes of resistant starch, and plasma glucose peaks, caused by high levels of readily digestible starch.

The essential steps in the process for producing slowly digestible starch (SDS) having a useful particle size are the heating step and the cooling step. The heating should be at conditions which are equivalent of at least 120° C. for 3 minutes, up to e.g., 30 minutes. The heating temperature should be sufficient for melting most of the amylose, but not so high to degrade the amylose. This will typically imply a minimum temperature of about 110° C. (for melting purposes) and a maximum temperature of about 160° C. (to avoid degradation). It is obvious that the maximum temperature may be easily determined by the skilled person in practice. Examples of such equivalent conditions are 110° C. for 6-75 minutes, 130° C. for 1-10 minutes, 140° C. for 15 sec.-5 minutes etc. Preferred time periods are 4-30 minutes at 121° C., 3-20 minutes at 124° C., 2-15 minutes at 130° C. Although lower temperatures can be used for producing a product having the desired particles distribution, provided the reaction time is sufficient as indicated above, it is preferred to use temperatures of at least 120° C. in order to obtain high proportions of slowly digestible starch, more preferred at least 123° C., and most preferred at least 127° C.

The cooling rate is a least 5° C. per minute, preferably at least 10° C. per minute over at least a temperature range of 20° C., preferably over the whole temperature range. In particular, the cooling rate may be high around the melting temperature of amylose, i.e., between 100 and 60° C. Alternatively or additionally, in a preferred embodiment, cooling is fast (more than 10° C. per min) over the range down from 40° C., in particular between 30 and 40° C. Thus, the temperature range between 40 and 30° C. should preferably be passed within 2 minutes, especially within 1 minute, most preferably within 30 sec. Cooling should be continued until at least below 20° C., preferably down to below 10° C., especially down to below 5° C. Rapid cooling can be performed on an industrial scale using conventional equipment, such as high-capacity heat exchangers.

It is preferred that after the treatment the product is not kept at ambient temperatures for prolonged periods of time; especially, the time wherein the product is kept between 10 and 30° C. should preferably be less than 7 days, or rather less than 72 hours, more preferably less than 24 hours. The product, when stored at a temperature of 5° C., is stable for at least 1 month, meaning that the content of SDS does not decrease by more than 10%, in particular by not more than 5%, and no more than 10% of the starch settles from a liquid product.

The heat-treated starch can be stored as such or directly used. Alternatively, it can be spray-dried or freeze-dried quickly after cooling, preferably at temperatures below 15° C., and stored as a powder, which can be reconstituted upon use.

Preferably, the heat treatment is performed on a suspension containing starch and optionally other food components, wherein the dispersed starch is present in a concentration of at least 2 wt. % (m/m), more preferably at least 4 wt. %, most preferably at least 6 wt. % up to e.g., 20 wt. %. In particular, the suspension medium is aqueous, meaning that at least 40 wt. %, preferably at least 60 wt. % of the suspension is water.

The slowly digestible starch product according to the invention has an amylose content of at least 60 wt. %. Preferably the amylose content is above 65 wt. % and below 90 wt. %, the remainder of the starch preferably being of the amylopectin (i.e., branched) type. It may have an average degree of polymerization of between 15 and 100 anhydroglucose units, preferably between 20 and 70 anhydroglucose units. This is equivalent to a weight-average molar weight of between 2,400 and 16,200, preferably between 3,200 and 113,000.

The starch product has a (volume) median particle diameter of between 0.1 and 20 µm. In particular, the starch product has a median particle size between 1 and 15 µm, more in particular between 3 and 12, especially between 5 and 10 µm. In addition to the volume median particle diameter D(v, 0.5), which defines the diameter at which 50 vol % (and with density being equal, also weight 50 wt. %) of the particles has a lower diameter, the particle size can also be defined as the volume moment mean diameter D[4,3], which is the diameter having the highest volume of particles. The D[4,3] value for the starch product of the invention is preferably between 0.5 and 25 µm, more preferably between 4 and 20 µm, most preferably between 8 and 18 µm. At least 90 wt. %, preferably at least 95 wt. % of the particles has a particle size of less than 50 µm. Preferably at least 80 wt. %, more preferably at least 90 wt. %, of the particles have a particle size of less than 20 µm.

The products of the invention can be distinguished by their particle size distribution upon heating. The product of the invention shows a different particle size distribution when heated and then slowly cooled, compared to the same heating and then rapid cooling. The difference is an at least 10% lower [D4,3] value and/or an at least 15% lower D(v, 0.5) value for the product of the invention compared to the same product not containing the heat-treated starch according to the invention.

The terms "rapidly digestible starch" (RDS), "slowly digestible starch" (SDS) and "non-digestible starch" (NDS) as used herein correspond to the classification taught by Englyst, H. N. et al. *Eur. J. Clinical Nutrition* (1992) 46:S33-50. The classification method involves incubation with pancreatic amylase and amyloglucosidase at 37° C. RDS is the starch hydrolyzed during the first 20 minutes, and SDS is the starch hydrolyzed in the following 100 minutes, i.e., between 20 and 120 minutes after the start of incubation. NDS is that fraction of the starch which escapes digestion during the first 120 minutes after start of the digestion test, NDS equalling the RS part of a resistant starch ingredient throughout the application. The contents of the relevant pages S35, S38 and S39 describing the classification method are hereby incorporated by reference. The total amount of starch, including resistant starch, is determined according to the method as provided by McCleary, *J Assoc. Off. Anal. Chem. Int,* 85:1103-111.

The starch product of the invention is characterized by a relatively high proportion of slowly digestible starch (SDS) of at least 15 wt. %, and relatively low proportions of both readily digestible starch (RDS) of less than 60 wt. %, and non-digestible (resistant) starch (NDS) of less than 50 wt. %. The SDS content is preferably at least 20 wt. %, more preferably at least 25 wt. %, more preferably at least 30 wt. %. The practical upper limit of SDS is 75 wt. %, in particular 60 wt. %, especially 45 wt. %. The RDS content is preferably below 50 wt. %, most preferably below 48 wt. %, the lower limit being e.g., 15 wt. %, in particular 25 wt. %. The NDS (RS) content of the product of the invention is preferably below 40 wt. %, more preferably below 30 wt. %, especially below 27 wt. %, or even no more than 25 wt. %. The practical lower limit is 10 wt. %, in particular 15 wt. % NDS. These percentages are on the basis of the total starch product, i.e., NDS+SDS+RDS.

The starting material for the slowly digestible starch product of the invention can be any (resistant) starch product having a substantial proportion of NDS. Preferably, the starting material is a resistant starch of the RS3 type, i.e., non-granular retrograded or crystalline starch. For example, the starting material can be a partly hydrolyzed, optionally debranched, and retrograded starch as commercially available, e.g., under the trade name Actistar® by Cerestar. The starch can be derived from any source, such as wheat, tapioca, potato, corn, rice, etc.

The slowly digestible starch product of the invention can be combined with further carbohydrates, digestible or non-digestible, or, preferably, both. In particular, a carbohydrate composition of the invention contains between 10 and 80 wt. % (on a total carbohydrate basis), preferably 15-50 wt. % of the slowly digestible starch product described above, together with 0-80 wt. %, in particular 10-70 wt. %, especially 30-60 wt. % of other digestible carbohydrates (not including the RDS and SDS parts of the slowly digestible starch product of the invention) and 0-30 wt. %, in particular 5-20 wt. %, of non-starch fiber.

Examples of other digestible carbohydrates include glucose, maltose and maltodextrins, fructose, lactose and sucrose. Furthermore, the carbohydrate composition may contain mono- and disaccharides other than glucose, fructose, maltose, lactose and sucrose, such as galactose, ribose, mannose, tagatose, isomaltose, palatinose, and trehalose, and non-amylose (=non-α-1,4-linked) glucose oligomers such as panose, isomalto-oligosaccharides and the like, which are slowly digestible.

Non-starch fibers that can be incorporated include soluble polysaccharides, such as galactans (e.g., gum Arabic, pectins), galactomannans (e.g., guar, tara, carob), arabinogalactans, xyloglucans (e.g., tamarind gum), glucomannans (e.g., konjac), (arabino)xylans (psyllium), fructans (levan, inulin), β-glucans, etc. and their mild hydrolysis products, non-soluble polysaccharides, such as cellulose, and oligosaccharides, such as fructo-, galacto-, arabin-, manno- and xylo-oligosaccharides, soy oligosaccharides etc.

As an example, the carbohydrate composition may contain, in addition to the NDS, SDS and RDS of the slowly digestible starch component (a) of the invention (15-50 wt. %):

b) 10-60 wt. %, preferably 20-40 wt. % of readily digestible glucose equivalents selected from glucose, maltose and maltodextrins;

c) 0-25 wt. % preferably 2-20 wt. % of fructose, lactose and/or sucrose;

d) 0-50 wt. % preferably 10-35 wt. % of mono- and disaccharides other than glucose, fructose, maltose, lactose and sucrose; in particular 5-25 wt. % of other monosaccharides than glucose and fructose, especially galactose, mannose and/or ribose, and 5-30 wt. % of other glucose-containing disaccharides than maltose, lactose and sucrose, especially palatinose, leucrose, trehalose, trehalulose and/or turanose;

e) 0-30 wt. %, preferably 0-20 wt. % of non-amylose glucose oligomers;

f) 0-30 wt. %, preferably 5-20 wt. % of non-starch fibers, preferably at least half of which—or alternatively, 3-10 wt. % on total carbohydrates—are soluble non-starch oligosaccharides, such as galacto-, manno-, fructo- and xylo-oligosaccharides.

The above percentages are calculated on the basis of the total carbohydrate fraction. In the present description, the terms "oligosaccharide" and "oligomer" denote polymers having from 3 to 20 monose units. The term "non-amylose glucose oligomers" is used to note glucose oligomers having a majority of links other than α-1,4 links. The presence of one or more, but less than half of the total, of non-glucose units still allows the oligomers to be referred to as glucose oligomers. These are considered to be slowly digestible.

In a particularly preferred embodiment, the invention pertains to a liquid food product containing proteins, lipids, digestible carbohydrates and/or dietary fiber, comprising the starch product or the carbohydrate composition described above. The food product is preferably sterilized, wherein the sterilization may be carried out separately for different food components, or for various combinations of food components, including the slowly digestible starch product, wherein the sterilization and the heat treatment of the resistant starch material are one and the same process step.

The food product according to the invention preferably has a protein content of 5-35 en. % (energy %, i.e., percentage of total energy provided by carbohydrates, proteins and lipids), more preferably of 10-30 en. %, most preferably 12-24 en. %, a lipid content of 8-50 en. %, more preferably 10-40 en. %, most preferably 15-35 en. %, and a digestible carbohydrate content, including slowly digestible starch, of 25-80 en. %, preferably 35-70 en. % and most preferably 45-60 en. %. The dietary fiber content, including non-digestible starch, may be between 5 and 60, preferably between 10 and 40 g per 1000 kcal. The amount of non-starch fiber may be between 2 and 40, preferably between 5 and 25 per 1000 kcal.

The products of the invention can be used for the treatment of diabetes, obesity, insulin resistance, or for controlling postprandial glucose response, as further described below.

The carbohydrate composition may be used as such, e.g., as a supplement, or be part of a partial or complete food product, further containing proteins and/or lipids and/or fibers, minerals, vitamins etc. The composition may be a dry powder, or a solid or semi-solid composition. Preferably, the food product is a liquid, suitable for tube or sip feeding. It has an osmolality of preferably 300-700, more preferably 330-600, most preferably 340-500 mOsm/l, and having an energy density between 0.6 and 2.0, more preferably between 0.75 and 1.5 kcal/ml. In a liquid, the product preferably comprises the available carbohydrate fraction of the invention in an amount of 60-200, preferably 80-160, more preferably 100-140 g/l.

The viscosity of the food product is low in order to provide acceptable flowing characteristics for sip-drinking and for tube feeding. Measured at 20° C. at a shear rate of 100/sec, viscosity is 1-60, preferably 1.4-40, more preferably 1.8-30 Mpas (for reference: the value for water is one).

The nutritional products of the invention may further comprise an insulin-releasing agent, preferably sulfonylurea, and/or an antidiabetic drug, preferably biguanidine and/or thiazolidinedione. If sulfonylurea is present, the composition of the invention preferably contains an amount of 0.1-4 g per kg dry matter hereof.

The protein fraction of the nutritional compositions of the invention can be based on a source of vegetable protein, to which at least one free amino acid, a peptide or a protein from animal source can be added. The protein fraction preferably originates for 10-99 wt. %, preferably 20-80 wt. % from plant species belonging to the species of fabales or leguminosae. It is preferred that the proteins originate from one or more members of the group of soybean (*Glycine max*), pea (*Pisum* species), bean (*Phaseolus* species), fenugreek (*Trigonella* species), lupine (*Lupinus* species), lentil (*Lens* species), peanut (*Arachis* species), tamarind (*Tamarindus*), clover (*Trifolium*) and alfalfa (*Medicago*). Such protein compositions further support the improvement of postprandial glucose response and postprandial insulin response. Alternatively, or in addition, 5-75 wt. %, in particular 10-50 wt. % of the protein can be mycoprotein, preferably originating from *Fusarium*, especially *F. venenatum*. The remainder of the protein, i.e., 1-90 wt. %, preferably 20-80 wt. %, can be of animal origin.

The amino acids or peptides are selected to be rich in those amino acids which increase nutritional value of the protein fraction as a whole in terms of the demand for essential amino acids. In particular these amino acids are lysine, leucine and phenylalanine. The compositions may comprise per 100 g amino acids 1.8-5 g methionine, and/or 4.5-9 g threonine, and/or 8.6-17 g leucine, and/or 5.5-9.5 g proline. The protein source of animal origin is selected in particular from milk proteins and liquefied proteins from muscle from animal or fish-like hydrolyzed proteins. Milk proteins are particularly preferred, especially whey proteins and more in particular those whey proteins that comprise less than 40 wt. % and preferably less than 30 wt. % kappa-casein or glycomacropeptide, calculated on protein base. Preferably at least 30 wt. %, more preferably at least 40 wt. % of the animal protein is α-lactalbumin and/or egg or egg-white protein.

The amount of protein in the products is preferably 0.5-15 g, more preferably 1-10 and most preferably 2-7 g per 100 ml product. Calculated as the amount of energy that is provided by proteins, lipids and digestible carbohydrates, by using the Atwater factors (4, 9, 4, respectively) for each of them, the amount of energy for protein is 10-30 en. %, preferably 14-28 en. %, most preferably 17-26 en. %, and for digestible carbohydrates 35-70 en. %, preferably 40-60 en. % and most preferably 42-55 en. %. The composition comprises 5-80 g/l, preferably 20-50 g/l, of a protein fraction.

The nutritional compositions of the invention further comprise a fat or lipid fraction. Such a lipid fraction comprises oleic acid and essential fatty acids like linoleic acid and alpha-linolenic acid, but could also comprise conjugated linolenic acids and omega-3 long chain fatty acids like timnodonic acid (EPA) and cervonic acid (DHA). The fatty acids preferably comprise less than 10 wt. % saturated fatty acids, and less than 1 wt. % of trans fatty acids. The amount of lipid is 10-60 g/l, preferably 15-50 g/l, more preferably 31-46 g/l. Expressing the amount of lipid in the product as en. % using the Atwater factors the amount of lipid is 25-45 en. %, preferably 28-40 en. % and most preferably 30-38 en. %. Lipids include triglycerides, diglycerides, monoglycerides, (lyso) phospholipids, sphingolipids and ceramides. Other components that are soluble in petroleum ether or hexane, like cholesterol and other sterols, are not included in calculations about the lipid fraction.

Moreover the food product can comprise micro-ingredients like vitamins, trace elements and minerals that are known in the art and carnitine equivalents, inositol, taurine and other food constituents such as flavors, colorants or manufacturing aids. The amount of calcium and phosphorus are also selected to be within the range of 10-70 mg/100 ml, preferably 20-60 mg/100 ml. The ratio of calcium to phosphorus is in the range 0.8-2, preferably 1.1-1.9, more preferably 1.3-1.8.

The nutritional compositions according to the invention are useful in maintaining a low and prolonged glucose response in blood and tissue after consumption, and especially useful in cases of diabetics and/or insulin-resistance. People that suffer from or are extremely susceptible to insulin-resistance are e.g., severely or critically ill patients, in particular palliative patients like those that suffer from severe cancer or HIV infection. Other groups of patients suffering from difficulties to control their PPGR comprise those persons that were subjected to major surgery or exposed to other traumata, malnourished persons in particular those suffering from protein-energy malnutrition, persons that suffer from obesity, the Metabolic Syndrome, Syndrome X, hyperglycemia, hyperinsulinemia, dyslipidemia, hypertriglyceridemia and dysfibrinolysis, but also large parts of the group of the elderly in Western societies. In addition the product can be useful for persons that have an increased risk in terms of a hereditary history of developing insulin resistance, PPGR in the mammal's blood for a period starting after 20 minutes to 4 hours after administration. It is even more preferred to maintain the glucose concentration stable until 3 hours, more preferably until 2 hours after administration. A substantially flat glucose level or PPGR means that the glucose level in blood does not vary more than about 1.6 mM and preferably less than 1.3, more preferably less than 1.0 mM per 20 minutes during the abovementioned period after consumption.

In case of diabetics, the glucose blood levels are typically maintained between 4 mM and 15 mM. However, in the case of severe diabetics peak postprandial glucose concentrations above 15 mM can still be observed. Under these circumstances the nutritional composition comprising the carbohydrate fraction of the invention should be consumed in more than one eating session and/or in combination with administration of an appropriate amount of insulin prior to consumption of the food product. In case of non-diabetics it is possible to control the glucose blood level even below 11 mM.

Preferably the glucose levels in plasma can be controlled between 5 and 8 mM in the abovementioned period, without the necessity to consume large amounts of fiber with it, as this may cause gastrointestinal discomfort, and without replacing glucose sources by other carbohydrates, which demand an unrealistic high metabolic capacity in the person, or by high amounts of lipids, which may disturb obesity or diabetics like many Hindustan persons and several Caucasian families, for persons that plan irregular feeding pattern, like sportsmen during an enduring exercise or persons that desire to maintain attention for longer periods of time, like students during studying or examinations or during meetings.

Thus, the starch product, the carbohydrate composition and the nutritional compositions of the invention can be used for the prevention and/or treatment of diabetics, insulin-resistance, obesity, controlling postprandial glucose response, metabolic syndrome, syndrome X, hyperglycemia, hyperinsulinemia, dyslipidemia, hypertriglyceridemia, dysfibrinolysis and/or disorders associated with major surgery or trauma in a mammal, by maintaining a substantially stable glucose level or physiologically acceptable blood lipid or cholesterol profiles.

The product can also be used for preventing—in persons which have shown to be susceptible thereto—or treating periods of hypoglycemia, hypoglycemia being understood to apply when the plasma glucose level is below 4 mmol/l. This is particularly desired for diabetics, for example after insulin administration, or during long fasting, such as overnight.

Moreover the products are effective in decreasing the risk for obtaining and decreasing the aggravation of several diseases which are associated with frequently elevated blood glucose levels, which include retinopathies, kidney diseases and neuropathies. Also diseases associated with the occurrence of advanced glycation products (AGE) can be prevented. Effectiveness of the product can be determined by measuring the levels of glycated hemoglobin molecules (Hb1Ac) in blood.

EXAMPLES

Methods

Resistant starch (RS), slowly digestible starch (SDS) and rapidly digestible starch (RDS) contents and particle size distribution were determined as described below.

Determination of RDS and SDS

The amounts of Rapidly Digestible Starch and Slowly Digestible Starch in each sample were determined by a method developed by Englyst et al. (*Am. J. Clin. Nutr.*, 1999, 448-454).

This method is modified at two points: The glucose quantification was done using a spectrophotometric assay instead of an HPLC assay. The reaction was stopped using 1M HCl instead of ethanol and samples were clarified using Carrez reagents.

Procedure in Short:

25 ml of food sample, diluted or dissolved to 10 mg CHO/ml, is incubated in a shaking water bath with a pepsin/guar/HCl solution for 30 min at 37° C. to mimic gastric digestion. This is followed by a 120 min incubation with pancreatin/invertase/amyloglucosidase solution to mimic intestinal carbohydrate digestion. At the start of the intestinal digestion (t=0), at t=10, t=20, t=30, t=60 and t=120 a sample is added to 1M HCl solution. Subsequently Carrez I, Carrez II and 0.1 M NaOH solution is added to the sample, with mixing after each addition, and the total is filtered through a 0.45 μm filter. Glucose in the clear filtrate is measured using GOD-PAP kit (Roche Diagnostics). The glucose formed in the first 20 min represents the RDS, the glucose formed in the following 100 min represents the SDS.

The performance of the assay is monitored each run by a control; boiled potato starch, of which all starch is RDS.

Determination of Resistant Starch

The amount of RS and DS in each sample was determined by AOAC method 2002.02, AACC method 32-40 developed by McCleary et al. (*J. AOAC Int.* 85, 2002, 665-675; ibid. 2002, 1103-111). All necessary reagents were purchased from Megazyme International Ireland Ltd. as Resistant Starch Assay Kit K-RSTAR.

Procedure in Short:

100 mg of dry matter of each sample is incubated in a shaking water bath with pancreatic α-amylase and amyloglucosidase (AMG) for 16 hr at 37° C., during which time non-resistant starch is solubilized and hydrolyzed to glucose by the combined action of the two enzymes. The reaction is terminated by the addition of an equal volume of ethanol, and the RS is recovered as a pellet on centrifugation. This is then washed twice by suspension in aqueous ethanol (50%), followed by centrifugation. Free liquid is removed by decantation. RS in the pellet is dissolved in 2 M KOH by vigorously stirring in an ice-water bath over a magnetic stirrer. This solution is neutralized with acetate buffer and starch is quantitatively hydrolyzed to glucose with AMG. Glucose is measured with glucose oxidase/peroxidase reagent (GOPOD), and this a measure of RS content of the sample. DS is determined by pooling the original supernatant and washings to 100 ml and measuring glucose content with GOPOD. The sum of RS and DS as percentage of the amount of starting material resembles the recovery, which was between 80 and 100 wt. % in all reported conditions.

The performance of the assay is monitored each run by four controls included in Resistant Starch Control Flours Kit K-RSTCL from Megazyme International Ireland, Ltd.: Regular Maize Starch 0.67 wt. % RS, Dried and Milled Kidney beans 4.7 wt. % RS, Actistar 48.3 wt. % RS and native Potato Starch 63.4 wt. % RS.

Determination of Particle Size Distribution

Particle size distribution was analyzed using a Mastersizer (Malvern Instruments; Range Lens: 300RF mm; Beam length: 2.40 mm; Sampler: MS 14; Analysis model: polydisperse). All samples were measured at an obscuration of 15-25%. The data is expressed as % of the total particle volume occupied by particles with a certain diameter.

Example 1

Actistar, purchased from Cerestar, was suspended in dematerialized water (14.7% (m/m)). The suspension was heated for 5 min at 80, 90, 100, 110, 120 or 130° C. in an oil bath and then cooled to room temperature with running tap water. 24 hrs (storage at 20° C.) after this heat treatment, the RDS, SDS and RS content and the particle size distribution were measured. The RDS, SDS and RS contents as determined with the Englyst method are given in Table 1 below, Values are expressed as percentage of the weighed powder; i.e., in g/100 g "as is", and expressed as mean±SEM (n=3). As the total weight of the Actistar includes 5.7 wt. % of non-starch components (water, protein and ash), the amounts total to 94.3 wt. %.

TABLE 1

| Treatment temperature (° C.) | Rapidly digestible starch (g/100 g) | Slowly digestible starch (g/100 g) | Resistant starch (g/100 g) |
|---|---|---|---|
| 80 | 28.6 ± 2.0 | 10.4 ± 0.9 | 55.3 ± 2.3 |
| 90 | 32.9 ± 2.3 | 13.8 ± 2.2 | 47.6 ± 4.5 |
| 100 | 37.1 ± 3.5 | 16.3 ± 3.6 | 40.9 ± 6.8 |
| 110 | 40.3 ± 1.0 | 25.6 ± 5.4 | 28.4 ± 5.9 |
| 120 | 43.2 ± 1.9 | 32.4 ± 4.9 | 18.7 ± 6.2 |
| 130 | 39.6 ± 5.0 | 33.1 ± 2.7 | 21.5 ± 5.9 |

Example 2

Following the procedure of Example 1, Actistar was heated at 124° C. for 4 min at three different concentrations: 4, 8 and 15 wt. % (m/m). At each concentration, cooling was done either slowly (on air) or rapidly (using ice water). The RDS, SDS and RS contents are given in Table 2 below.

TABLE 2

|  | 4 wt. %, slow | 4 wt. %, rapid | 8 wt. %, slow | 8 wt. %, rapid | 15 wt. % slow | 15 wt. %, rapid |
|---|---|---|---|---|---|---|
| RDS | 50 | 49 | 42 | 39 | 33 | 35 |
| SDS | 7 | 22 | 11 | 36 | 16 | 38 |
| RS (NDS) | 37 | 23 | 41 | 19 | 45 | 20 |

Table 2 shows that rapid cooling leads to a drastic increase in SDS content, and that more concentrated suspensions have a higher SDS content that less concentrated suspensions. The particle size distribution shifts to lower sizes with rapid cooling, especially in more concentrated suspensions.

Example 3

Following the procedure of Example 1, Actistar was heated at 124° C. for 4 min at 6 wt. %. Cooling was done according to four different modes: (a) slowly (on air) to room temperature, (b) slowly to 30° C. and then fast to room temperature in an ice water bath, (c) slowly to 40° C. and then fast to room temperature in an ice water bath, and (d) fast to room temperature in an ice water bath. The RDS, SDS and RS contents are given in Table 3 below.

TABLE 3

|  | (a) slow | (b) slow/ rapid 30° C. | (c) slow/ rapid 40° C. | (d) rapid |
|---|---|---|---|---|
| RDS | 44 | 48 | 42 | 38 |
| SDS | 11 | 19 | 33 | 40 |
| RS (NDS) | 39 | 27 | 19 | 16 |

Table 3 confirms that rapid cooling leads to a drastic increase in SDS content, and that especially the range between 30 and 40° C. is important. The particle size distribution shifts to lower sizes with rapid cooling, and only rapid cooling down from 40° C. and rapid cooling over the whole range produces more than 95% of particles below 12 μm.

Example 4

The following products were prepared and heated at 121° C. for 4 min, and then either rapidly (ice) slowly (air) cooled.
1. 4 wt. % actistar in water
2. 4 wt. % actistar in a food product (a fiber-containing food, Tentrini)
3. the same product as 2 without actistar.
The results are as shown in Table 4.

TABLE 4

| particle diameter (μm) | D(v, 0.5) rapid | D(v, 0.5) slow | D[4,3] rapid | D[4,3] slow |
|---|---|---|---|---|
| product 1 | 13 | 23 | 16 | 32 |
| product 2 | 9 | 13 | 17 | 23 |
| product 3 | 1 | 1 | 12 | 13 |

Example 5

Figure 2:
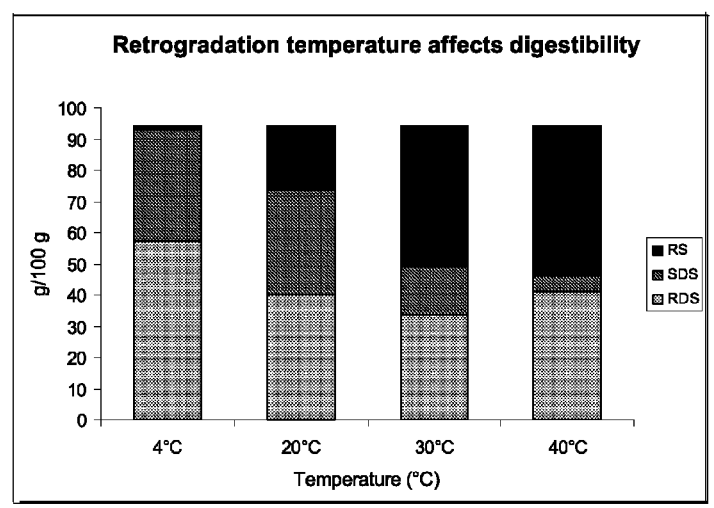
FIG. 2 shows the rapidly digestible starch (RDS), slowly digestible starch (SDS) and resistant starch (RS) content of Actistar® after heat treatment and then cooling to different temperatures, expressed as percentage of the weighed powder. Details are provided in Example 2.

Actistar, purchased from Cerestar, was suspended in dematerialized water (14.7 wt. %). The suspension was heated for 5 min at 121° C. in an oil bath and then cooled to different temperatures (4° C., 20° C., 30° C. and 40° C.) in a water bath. 24 hrs (storage at said temperatures) after this heat treatment, the RDS, SDS and RS content were measured. The RDS, SDS and RS contents as determined with the Englyst method are given in FIG. 2, Values are expressed as percentage of the weighed powder; i.e., in g/100 g "as is", and expressed as duplicate mean. As the total weight of the Actistar includes 5.7 wt. % of non-starch components (water, protein and ash), the amounts total to 94.3 wt. %. It is clearly demonstrated that most of the RDS is present at a temperature of 4° C., nearly the total amount of RS being converted into SDS and RDS.

What is claimed is:

1. A sterilized food product containing starch, the starch having:
   (a) an amylose content of at least 60 weight % (wt. %);
   (b) a median particle size of between 1 and 15 μm, wherein at least 90 wt. % of the starch particles have a particle diameter of less than 50 μm;
   (c) a non-digestible starch content of less than 50 wt. %; and
   (d) a slowly digestible starch content of 15-75 wt. %.

2. The food product according to claim 1, in which at least 80 wt. % of the particles have a particle size of less than 20 μm.

3. The food product according to claim 1, in which the mean particle size is between 2 and 12 μm.

4. The food product according to claim 1, wherein the non-digestible starch content is between 10 and 35 wt. %, and/or the slowly digestible starch content is between 20 and 60 wt. %, and/or a readily digestible starch content is between 15 and 60 wt. %.

5. The food product according to claim 1, which is a liquid product.

6. The food product according to claim 1, which comprises 25-80 energy % (en. %) digestible carbohydrates, and additionally, 5-35 en. % proteins and/or 8-50 en. % lipids.

7. The food product according to claim 1, further comprising non-digestible carbohydrates other than said non-digestible starch in an amount of 5-20 grams per 100 grams total carbohydrate or 5-25 grams per 1000 kcal.

8. The food product according to claim 6, in which the protein content is 10-30 en. %, the lipid content is between 10 and 40 en. %, the digestible carbohydrate content, including slowly digestible starch, is between 25 and 80 en. %, and a non-digestible carbohydrate content, including non-digestible starch, is between 10 and 40 grams per 1000 kcal.

9. The food product according to claim 1, wherein the slowly digestible starch content decreases by no more than 5 wt. % when the product is stored at 5° C. for 1 month.

10. The food product according to claim 4, wherein said starch has a non-digestible starch content between 15 and 30 wt. %.

11. The food product according to claim 4, wherein said starch has a slowly digestible starch content between 25 and 45 wt. %.

12. The food product according to claim 4, wherein said starch has a readily digestible starch content between 25 and 50 wt. %.

13. A process for producing a starch composition that comprises slowly digestible starch, the process comprising:
   (a) heating a starch material that is at least partly non-digestible and has an amylose content of at least 60 wt. % to a temperature of at least 110° C.;
   (b) rapidly cooling the heated starch material of (a) to below 20° C., at an average cooling rate of at least 10° C. per minute over the entire temperature range.

14. The process according to claim 13, wherein, in step (b), the heated starch material is cooled to below 5° C.

15. A method for treating diabetes, obesity, insulin resistance, or for inducing a post-prandial glucose response, comprising feeding a subject in need thereof the food product according to claim 1.

* * * * *